Patented Mar. 20, 1945

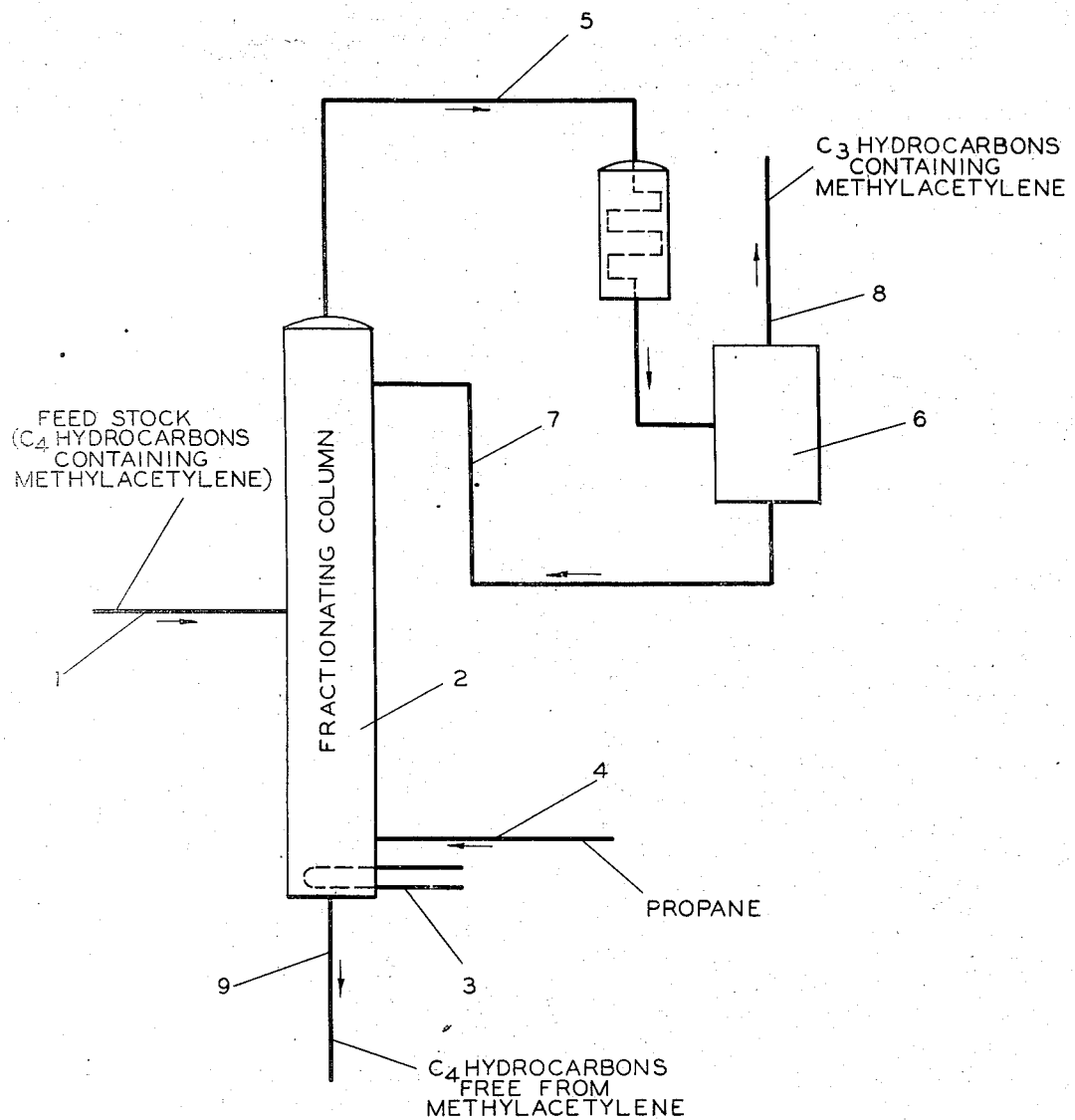

2,371,860

UNITED STATES PATENT OFFICE 2,371,860

SEPARATION OF METHYLACETYLENE FROM C₄ HYDROCARBONS

William S. Walls and Maurice R. Dean, Bartlesville, Okla., assignors to Phillips Petroleum Company, a corporation of Delaware Application December 16, 1943, Serial No. 514,566

15 Claims. (Cl. 202—42)

This invention relates to a process of separating methylacetylene from C₄ hydrocarbons and especially from butadiene or from butadiene-containing mixtures of C₄ hydrocarbons or C₃ and C₄ hydrocarbons. As used herein the term "butadiene" is used in its usual sense to designate 1,3-butadiene.

Rubber synthesis requires a butadiene product not only of high purity (that is containing a maximum percentage of butadiene), but also as free as possible of traces of materials deleterious to the synthesis operations or to the quality of rubber produced. In certain processes for the manufacture of butadiene, such as the catalytic dehydrogenation of normal butenes, small quantities of acetylenes often are formed and appear in the products of reaction. The volatility of certain of these acetylenes is such that they may increase to an undesirable concentration in the finished butadiene product unless suitable steps are taken for their removal during the process of separating the butadiene from the other hydrocarbons present in the reaction products.

Methylacetylene has given particular difficulty as an impurity in butadiene. It has been extremely difficult and frequently impossbile to remove completely this C₃ acetylene from the butadiene product. The preparation of butadiene free from any trace of methylacetylene where, as is almost invariably the case, this material is present in the crude butadiene-containing mixture fed to the purification system, has therefore been a very serious problem. This is unexpected since it would be anticipated from a consideration of the number of carbon atoms and the boiling points and volatilities of the several hydrocarbons in pure form that all of the methylacetylene could be easily separated from the C₄ hydrocarbons by simple fractional distillation. Thus pure methylacetylene boils at −9.6° F. while the boiling points of the C₄ hydrocarbons commonly encountered range upwardly from 10.8° F.

The reason why removal of methylacetylene presents such a problem is somewhat obscure. While we do no wish to be limited by any theory we believe that this difficulty may be attributable to the changing relative volatility of methylacetylene with varying composition of hydrocarbons, of paraffin, olefin, and diolefin types, or to the formation of an azeotrope or azeotropes between the methylacetylene and one or more of the C₄ hydrocarbons present which azeotrope or azeotropes boil so close to butadiene that separation by ordinary fractional distillation is very difficult or impossible.

One process for separating the butadiene from C₃ and C₄ hydrocarbons containing, in addition to butadiene, paraffins, olefins and acetylenes is carried out in several steps none of which utilize this invention. The first step involves the separation of most of the C₃ hydrocarbons from the C₄ hydrocarbons in a depropanizing column. This operation, as practiced heretofore, does not effect removal of all the methylacetylene. The methylacetylene not removed in this operation passes through the succeeding steps for separation of C₄ hydrocarbons and appears in the butadiene product. In the second purification step the C₄ hydrocarbons from the bottom of the depropanizing column are passed to a furfural absorbing column where the n-butane, isobutane, isobutylene and part of the butenes-2 are removed overhead. The kettle product contains the butadiene, C₄ acetylenes, the remainder of the butenes-2 and the methylacetylene which was not taken out in the depropanizing step. The furfural kettle product is then stripped, the hydrocarbons driven off being passed to a fractionating column where the butadiene is separated from the butenes-2 and C₄ acetylenes. Due to the relatively high solubility of methylacetylene in furfural, the methylacetylene which is not removed in the depropanizing column remains with the butadiene in the furfural kettle product and then passes overhead with the butadiene in the fractional distillation step, thus appearing in the final butadiene product.

An object of this invention is to provide an improved method of separating methylacetylene from C₄ hydrocarbons. Another object is to provide a method for more easily and more completely separating methylacetylene from C₄ hydrocarbon mixtures containing butadiene. Another object is to provide a method for more easily and more completely removing methylacetylene from butadiene such as concentrated butadiene which fails to meet the specification with respect to methylacetylene content. Another object is to provide a process of the foregoing type which is especially adapted to batch operation for use as an analytical or laboratory method whereby accurate analysis of a hydrocarbon mixture comprising butadiene and methylacetylene can be conducted or for use wherever it is desired to remove methylacetylene from butadiene or from a butadiene-containing mixture of C₄ or C₃ and C₄ hydrocarbons. Another object is to provide a batchwise method of the foregoing type which enables the absolutely complete removal of methylacetylene. Another object is to provide a continuous method of the foregoing type. Another object is to provide a method of separating methylacetylene from C₄ acetylenes. Another object is to provide a method of separating methylacetylene from other aliphatic C₄ hydrocarbons such as butanes and butenes. Numerous other objects will hereinafter appear.

The accompanying drawing portrays diagrammatically a preferred arrangement of equipment for carrying out the present invention in that embodiment wherein operation is continuous.

We have now found that methylacetylene can be more completely removed from C₄ hydrocarbons by fractionally distilling the mixture in the presence of propane preferably in sufficient amount to take overhead a major proportion or substantially all of the methylacetylene in admixture with the propane and any other C₃ hydrocarbon present, usually entirely propylene, while the C₄ hydrocarbons more nearly or completely free of methylacetylene form the bottom product.

We have discovered that propane increases the relative volatility of methylacetylene in butadiene-containing mixtures substantially above its normal volatility in such mixtures. Our invention takes advantage of this discovery and effects removal of methylacetylene by fractionally distilling in the presence of propane whereby a minimum-boiling azeotrope between the methylacetylene and propane is taken overhead freeing the bottoms product from methylacetylene. In this way the methylacetylene is prevented from appearing in subsequent steps applied to the butadiene or butadiene-containing bottom product and the butadiene product is enabled to meet specifications. The behavior of propane in this respect was most unexpected. The azeotrope formed between methylacetylene and propane is of the minimum-boiling type, requiring 140.3 Fahrenheit degrees of temperature for a pressure of 322.5 p. s. i. a. as compared with 174.8 degrees for pure methylacetylene and 143.8 degrees for pure propane. The azeotrope contains 15.5 mols of methylacetylene and 84.5 mols of propane.

While the use of small amounts of propane in accordance with the present invention gives a noticeable improvement in the degree of separation of methylacetylene, the use of larger amounts gives still better results. Where it is feasible the use of propane in amount sufficient to form the azeotrope with substantially all or all of the methylacetylene is preferred. The use of such an amount of propane as to remove all the methylacetylene overhead is very feasible in a laboratory or batch distillation but may not be feasible in a continuous operation because it may require use of a column of excessive size to accommodate the large amount of propane required to separate completely the methylacetylene.

The present invention may be carried out either continuously or batchwise. The batch operation is often preferred since use of a small and feasible amount of propane in such an operation effects complete removal of the methylacetylene whereas in a continuous operation the same amount of propane does not effect so great a degree of removal. However, since the application of the invention to an existing continuously operating system for handling butadiene-containing mixtures effects a marked improvement in the extent of methylacetylene removal, it is not intended to imply that it would be advisable to convert such a continuous system to batchwise operation.

Since no fractionating equipment can separate a component completely from the next higher boiling component, it is impossible by present fractionating methods to separate methylacetylene completely from the next higher boiling components namely the C₄ hydrocarbons. Due to the great difficulty or impossibility of determining quantitatively by present methods methylacetylene in the presence of C₄ acetylenes, a method whereby methylacetylene can be easily separated from the C₄ hydrocarbons is of great analytical value in the determination of methylacetylene when C₄ acetylenes are present. The present invention provides such an analytical method.

In the laboratory or batch distillation of mixtures of C₃ and C₄ hydrocarbons containing paraffins, olefins, diolefins and acetylenes, the addition of an adequate amount of propane in accordance with the present invention enables all of the methylacetylene to be removed overhead before all of the propane is taken out of the distillation column, thus allowing an absolutely complete separate of methylacetylene from the C₄ hydrocarbons, whereas in the absence of the propane some methylacetylene would stay with the C₄ hydrocarbons. Thus, in the case of an analytical distillation, the present invention makes possible in an easy manner the quantitative determination of methylacetylene in such a mixture and enables one to quantitatively distinguish between methylacetylene and C₄ acetylenes which is difficult by other known procedures, as is evidenced by the fact that most if not all specifications and analyses report simply "acetylenes (as vinyl acetylene)." Likewise in the case of a batch distillation this embodiment of the invention enables the complete removal of methylacetylene from the C₄ hydrocarbons containing butadiene with a minimum of propane without allowing any of C₄ hydrocarbons to go in the methylacetylene containing cut or vice versa.

In a batch operation the amount of added propane will depend upon the amount of methylacetylene and the completeness of removal which is desired. It will also vary slightly with the pressure. However it may be stated in general that at least 7 mols of propane per mol of methylacetylene should be present at the start. At a pressure of 322.5 pounds absolute this amount of propane effects complete removal of the methylacetylene. As the pressure is lowered somewhat higher mol ratios of propane to methylacetylene may be required for complete removal of methylacetylene. For example at atmospheric pressure 14 to 15 mols of propane per mol of methylacetylene may be required at the start to give complete removal. The amount of propane required may depend somewhat upon the composition of the mixture being distilled. Thus propylene acts to reduce the volatility of the methylacetylene relative to propane so that depending upon the amount of propylene present, a greater amount of propane is necessary. At least 10 mols of propane per mol of methylacetylene is preferred.

We have found in batch distillation, such as in laboratory analytical fractionation procedures, that the separation of methylacetylene from C₄ hydrocarbons is easiest when the ratio of propane to propylene in the depropanizing column is at least or in excess of 10 liquid volumes of propane per liquid volume of propylene. Under these conditions from 6 to 10 volumes of propane are required to remove 1 volume of methylacetylene and a minimum number of trays is required for the depropanizing or fractionating column. These are the preferred conditions in carrying out this invention as applied to laboratory or batch distillation operations. With this concentration of propane present the separation of methylacetylene from C₄ hydrocarbons in batch distillation is as easy as or easier than the separation of propane from C₄ hydrocarbons. This volatility behavior of methylacetylene is different from what would be expected on the basis of the normal boiling points of $C_3$ and some $C_4$ hydrocarbons which are as follows:

| | °F. |
|---|---|
| Propylene | −53.7 |
| Propane | −43.8 |
| Methylacetylene | −9.6 |
| Isobutane | 10.8 |
| Isobutylene | 19.2 |
| Butene-1 | 20.7 |
| 1,3-Butadiene | 23.9 |
| n-Butane | 30.9 |
| Butene-2 low | 33.8 |
| Butene-2 high | 38.7 |

It is readily apparent that increasing the volatility of methylacetylene (by the preferred practice of the present invention) greatly facilitates the operation of a depropanizing or fractionating column. Since the volatility of methylacetylene increases gradually with increase in propane concentration, even to very high propane concentrations, it may be desirable in practice to add only sufficient propane to enable the available depropanizing or fractionating column to produce from a given feed a product satisfactorily free of methylacetylene.

In continuous distillation processes, such as in the separation of $C_3$ and $C_4$ hydrocarbons in a depropanizing column, the benefits to be obtained by the addition of propane are dependent upon the position at which the propane is injected into the depropanizing column and also on the relative amounts of propane to certain $C_4$ hydrocarbons present in the section of the column into which propane is injected. In general the relative volatility of methylacetylene in the base of the depropanizing column, where $C_4$ olefins, diolefins, and $C_4$ acetylenes usually predominate, is low and increases gradually with increase in propane concentration; the maximum effect being obtained when the ratio of propane to $C_4$ hydrocarbons reaches a high value and the hydrocarbon composition is predominately propane. Due to the large amount of propane required to be injected to enable maximum increase in the relative volatility of methylacetylene, it is usually preferred not to seek to obtain the highest relative volatility for the methylacetylene. It is preferred to inject the propane at a suitable point below the feed tray and only in sufficient amounts to enable the given depropanizing column to operate to provide butadiene of sufficiently low methylacetylene content to meet desired specifications. The presence of propane in amounts relatively small with respect to $C_4$ hydrocarbons, but large with respect to methylacetylene, serves to increase the relative volatility of the methylacetylene and facilitates its separation from the $C_4$ hydrocarbons containing butadiene.

The process of adding propane to the depropanizing column greatly increases the range of feed stock compositions that can be handled in a given depropanizing column and the range of conditions under which a given depropanizing column can be operated to obtain satisfactory removal of methylacetylene from $C_4$ hydrocarbons containing butadiene.

The propane is preferably injected into the depropanizing column at some point below the feed tray, although some beneficial results can be obtained by injecting the propane into the column with the feed or at some point a few trays above the feed tray.

The preferred type of continuous operation involves continuously feeding the methylacetylene-containing and butadiene-containing mixture at an intermediate point in the fractionating column in which the depropanizing is conducted and continuously feeding a stream of propane at a point near the bottom of the column, an overhead product consisting of the $C_3$ hydrocarbons being taken off continuously and a bottoms product of the $C_4$ hydrocarbons being withdrawn continuously. The propane is preferably injected at a point near the bottom of the column such that little if any of the propane goes out in the bottom product. It has been observed in practice that the less the amount of propane going out in the bottoms the more complete the removal overhead of methylacetylene. Usually the point of propane injection will be two or three trays from the bottom of the column.

In continuous operation, just as in batch operation, the amount of propane is adjusted with reference to the methylacetylene content of the feed. A small amount of propane helps in removing methylacetylene and more is better. It has been found that a given amount of propane injected near the bottom of the column in the manner described in the preceding paragraph is much more effective than the same amount fed in at an intermediate point in the column, say at the main feed tray as for example in admixture with the feed.

The injection of propane at a low point in the column in the foregoing manner is advantageous since it necessitates no change in the column and no material change in the operation of the column.

The continuously operated column is so operated that most and preferably substantially all of the propane fed to the column either in the main feed or at the bottom or both goes out in the overhead, none or only very little going out in the bottoms.

The amount of propane injected continuously at the bottom of the column in the manner just described is generally such as to give a ratio of at least 7 and preferably at least 10 mols of propane per mol of methylacetylene in the liquid on the tray at which the propane is injected. Such an amount of propane will assist substantially the removal of methylacetylene.

The pressure at which either the batch or continuous distillation is conducted may vary within the usual limits employed in fractional distillation, say from atmospheric to 350 p. s. i. a.

Following is an example of the batchwise operation of the present invention:

Example

Propane was added to mixture of $C_3$ and $C_4$ hydrocarbons containing methylacetylene, butadiene, and $C_4$ acetylenes, giving 23.7 liters of material having the following analysis:

| Component | Mol per cent |
|---|---|
| Methylacetylene | 1.1 |
| Propylene | 24.9 |
| Propane | 57.0 |
| $C_4$ acetylenes | 0.6 |
| Other $C_4$'s and heavier including butadiene | 16.4 |

The above mixture was placed in the kettle of a Podbielniak Heligrid fractionating column and batch-distilled at atmospheric pressure. The first three liters taken overhead were about 90 mol per cent propylene and less than 0.1 mol per cent methylacetylene. The methylacetylene concentration in the overhead increased rapidly with increase in propane concentration and at 7 liters overhead the overhead product contained 4.7 mol per cent methylacetylene and 65 mol per cent propane. At 9 liters overhead the product contained 5.9 mol per cent methylacetylene and 83 mol per cent propane. The concentration of methylacetylene then started to decrease rapidly and at 12.5 liters the product contained 0.9 mol per cent methylacetylene and 97 mol per cent propane. The methylacetylene concentration continued to decrease until at 18.5 liters overhead the product contained 98.2 mol per cent propane and only 0.03 mol per cent methylacetylene. The end of the propane temperature plateau was encountered at 19.7 liters overhead. Samples obtained immediately after reaching the $C_4$ temperature plateau contained only $C_4$ unsaturates and about 0.05 mol per cent of acetylenes. At 22.3 liters overhead the $C_4$ acetylenes were 0.14 mol per cent and at 22.8 liters overhead were 5.9 mol per cent. Thus it will be seen that an absolutely clean separation between methylacetylene and the $C_4$ hydrocarbons was effected by means of the propane.

The invention is not limited to cases where the $C_4$ hydrocarbon comprises or consists of butadiene but is applicable broadly to separation of methylacetylene from any $C_4$ hydrocarbon or mixture of $C_4$ hydrocarbons such as n-butane, isobutane, butene-1, butenes-2, isobutylene, butadiene, vinylacetylene or ethylacetylene either singly or in any combination. It is especially applicable to the separation of methylacetylene from butadiene and from $C_4$ acetylenes.

The process of the present invention may be applied to butadiene contaminated with methylacetylene, the mixture consisting of butadiene and methylacetylene constituting the feed to the column and the distillation being carried out in the presence of an amount of added propane sufficient to take all or substantially all of the methylacetylene overhead and leave a kettle product consisting of pure butadiene and nearly or completely free from methylacetylene. Where batch distillation is practiced the bottoms are completely free from methylacetylene. In the case of continuous operation, it is substantially free.

The present invention may be employed in a batchwise embodiment to effect the removal of methylacetylene from butadiene in storage as in a tank car, storage tank, spheroid storage tank or the like by connecting a fractionating column to the storage container by a line to the vapor space therein and a line to the liquid space and passing propane continuously into the liquid in the storage tank whereby vapors of propane, methylacetylene and some butadiene pass through the vapor line into the fractionator where the butadiene is separated from the $C_3$'s and returned via the liquid line to the storage. Among advantages of this type of procedure are that the storage vessel functions as the kettle of the fractionator, the butadiene is cleaned up in storage, and the butadiene is enabled to meet specifications. Another advantage is that, if there is sufficient time, a fractionating column having only a small capacity can be employed. Another advantage is that such a method entails substantially only the refrigeration requirements already in use on the storage facilities since the already existing refrigeration system is simply transferred from the top of the spheroid or other container to the top of the fractionator. In fact no increase in refrigeration requirements is involved if the incoming propane is brought in as a liquid in indirect heat exchange with the overhead and the resulting vaporized propane fed into the liquid in storage. While this modification has been described with reference to removal of methylacetylene from butadiene it is applicable to any $C_4$ hydrocarbon or hydrocarbon mixture contaminated with methylacetylene such as butenes, butanes, $C_4$ acetylenes, either singly or in admixture.

If desired the overhead $C_3$ hydrocarbons, usually consisting of propane, propylene and methylacetylene although in some circumstances propylene may be absent, may be subjected to solvent extraction or gas scrubbing with a selective solvent which dissolves methylacetylene preferentially to propylene or propane and propylene preferentially to propane, thereby giving a pure propane residue which is conveniently recycled as the source of the propane added in accordance with the present invention. Such a solvent may be furfural.

In the accompanying drawing the feed containing at least one aliphatic $C_4$ hydrocarbon and methylacetylene passes continuously via line 1 into fractionating column 2. Heat is supplied by the usual reboiler 3. Propane is fed in continuously via line 4 at a point not far from the bottom of column 2. The $C_3$ overhead leaves via line 5 and, after cooling in the usual way to at least partially condense the same, passes to reflux accumulator 6 from which liquid condensate is returned as reflux via line 7 while $C_3$ hydrocarbons containing propane and methylacetylene, together with propylene if present in the feed, are withdrawn via line 8. The material withdrawn via line 8 is often in liquid phase but may be in gaseous phase or may comprise both liquid and gaseous phases depending upon the extent of condensation. A bottoms fraction containing all the $C_4$ hydrocarbons present in the feed and more nearly or completely free from methylacetylene is withdrawn continuously via line 9.

From the foregoing, it will be seen that the present invention provides a simple feasible method for insuring practically complete or complete removal of methylacetylene from $C_4$ hydrocarbons including butadiene. The batch distillation process makes possible the preparation of butadiene absolutely free from methylacetylene and the continuous process enables production of nearly methylacetylene-free butadiene even though the feed contains such a quantity of this compound that butadiene prepared therefrom by conventional methods will not meet the butadiene specification. The method of the present invention involves no disadvantages over prior practices which were incapable of achieving the results attainable by the practice of the present invention.

The terms "batch," "batchwise" and "continuous" as used herein have their ordinary meaning. Thus the terms "batch" or "batchwise" denote a distillation wherein the entire charge is placed in the kettle of the fractionating column and the bottoms product is either allowed to accumulate and withdrawn after the distillation is completed or is distilled stepwise and the overhead collected in several sequential fractions kept separate from one another. The term "continuous" designates a process wherein the $C_4$ or $C_3$ and $C_4$ hydrocarbon feed is charged continuously to the fractionator and the overhead and bottoms product are withdrawn continuously and simultaneously.

We claim:

1. The process of removing methylacetylene from a $C_4$ hydrocarbon which comprises fractionally distilling said hydrocarbon containing methylacetylene in the presence of propane and thereby taking overhead C₃ hydrocarbons including propane and methylacetylene and forming a bottom product comprising the C₄ hydrocarbon content of the mixture.

2. The process of effecting a separation between methylacetylene and C₄ acetylenes which comprises fractionally distilling a hydrocarbon mixture containing methylacetylene and at least one C₄ acetylene in the presence of propane and thereby taking overhead C₃ hydrocarbons including propane and methylacetylene and forming a bottom product comprising the C₄ hydrocarbon content of the mixture and containing the C₄ acetylene content thereof.

3. The process of effecting removal of methylacetylene from a C₄ hydrocarbon containing the same which comprises fractionally distilling in a batchwise manner a charge of said C₄ hydrocarbons and methylacetylene in the presence of propane in amount sufficient to take overhead all of said methylacetylene in admixture with propane and thereby forming a kettle product comprising the C₄ hydrocarbon and entirely free from methylacetylene.

4. The process of removing methylacetylene from a C₄ hydrocarbon containing the same which comprises fractionally distilling the mixture of said C₄ hydrocarbon and methylacetylene in a batchwise manner in the presence of propane in an amount sufficient to give a mol ratio of propane to methylacetylene of at least 7 to 1, removing overhead all of the methylacetylene in admixture with propane, and forming a bottoms product comprising said C₄ hydrocarbon and completely free from methylacetylene.

5. The process of removing methylacetylene from a C₄ hydrocarbon containing the same which comprises fractionally distilling the mixture of said C₄ hydrocarbon and methylacetylene in a batchwise manner in the presence of propane in an amount sufficient to give a mol ratio of propane to methylacetylene of at least 10 to 1, removing overhead all of the methylacetylene in admixture with propane, and forming a bottoms product comprising said C₄ hydrocarbon and completely free from methylacetylene.

6. The process of removing methylacetylene from a C₄ hydrocarbon containing the same which comprises fractionally distilling the mixture of said C₄ hydrocarbon and methylacetylene in a batchwise manner in the presence of propane in an amount sufficient to give a mol ratio of propane to methylacetylene of at least 14 to 1, removing overhead all of the methylacetylene in admixture with propane, and forming a bottoms product comprising said C₄ hydrocarbon and completely free from methylacetylene.

7. The process of removing methylacetylene from a C₄ hydrocarbon containing the same which comprises continuously feeding the mixture containing said C₄ hydrocarbon and methylacetylene to a fractional distillation column and fractionating same therein, continuously injecting propane into said column at a point adjacent the bottom of said column, continuously withdrawing from the top of said column a C₃ overhead comprising methylacetylene and propane, and continuously withdrawing from the bottom of said column a bottoms fraction comprising the C₄ hydrocarbon content of the feed and of substantially reduced methylacetylene content.

8. The process of removing methylacetylene from a C₄ hydrocarbon containing the same which comprises continuously feeding the mixture containing said C₄ hydrocarbon and methylacetylene to a fractional distillation column at an intermediate point therein and fractionating same, continuously injecting propane into said column at a point adjacent the bottom of said column in an amount such as to give a ratio of at least 7 mols of propane per mol of methylacetylene in the liquid in the column at the point of injection, continuously removing an overhead fraction containing propane and substantially all of the methylacetylene contained in the feed, and continuously removing a bottom fraction containing the C₄ hydrocarbon content of the feed and substantially free from methylacetylene.

9. The process of removing methylacetylene from a C₄ hydrocarbon containing the same which comprises continuously feeding the mixture containing said C₄ hydrocarbon and methylacetylene to a fractional distillation column at an intermediate point therein and fractionating same, continuously injecting propane into said column at a point adjacent the bottom of said column in an amount such as to give a ratio of at least 10 mols of propane per mol of methylacetylene in the liquid in the column at the point of injection, continuously removing an overhead fraction containing propane and substantially all of the methylacetylene contained in the feed, and continuously removing a bottom fraction containing the C₄ hydrocarbon content of the feed and substantially free from methylacetylene.

10. The process of removing methylacetylene from a C₄ hydrocarbon containing the same which comprises continuously feeding the mixture containing said C₄ hydrocarbon and methylacetylene to a fractional distillation column and fractionating same therein, continuously injecting propane into said column at a point adjacent the bottom of said column, the point of injection of said propane being slightly above the bottom of said column and so located that substantially no propane goes out in the bottom product, continuously withdrawing from the top of said column a C₃ overhead comprising methylacetylene and propane, and continuously withdrawing from the bottom of said column a bottom fraction comprising the C₄ hydrocarbon content of the feed and of substantially reduced methylacetylene content.

11. The process of effecting removal of methylacetylene from a C₄ hydrocarbon containing the same and butadiene which comprises fractionally distilling in a batchwise manner a charge of said C₄ hydrocarbon and methylacetylene in the presence of propane in amount sufficient to take overhead all of said methylacetylene in admixture with propane and thereby forming a kettle product comprising the C₄ hydrocarbon and entirely free from methylacetylene.

12. The process of removing methylactylene from a C₄ hydrocarbon containing the same and butadiene which comprises continuously feeding the mixture containing said C₄ hydrocarbon and methylacetylene to a fractional distillation column and fractionating same therein, continuously injecting propane into said column at a point adjacent the bottom of said column, continuously withdrawing from the top of said column a C₃ overhead comprising methylacetylene and propane, and continuously withdrawing from the bottom of said column a bottoms fraction comprising the C₄ hydrocarbon content of the feed and of substantially reduced methylacetylene content.

13. The process of removing methylacetylene from a C$_4$ hydrocarbon mixture containing butadiene and methylacetylene which comprises fractionally distilling said mixture in the presence of propane in amount sufficient to take at least the major portion of the methylacetylene overhead, removing overhead C$_3$ hydrocarbons including the propane and at least a major portion of the methylacetylene contained in said mixture, and forming a bottom product comprising the C$_4$ hydrocarbon content of the mixture and nearly free from methylacetylene.

14. The process of removing methylacetylene from a hydrocarbon mixture containing C$_4$ hydrocarbon including butadiene and also containing propylene and methylacetylene which comprises fractionally distilling said mixture in the presence of propane in amount sufficient to take at least the major portion of the methylacetylene overhead, removing overhead C$_3$ hydrocarbons including the propane and at least a major portion of the methylacetylene contained in said mixture, and forming a bottom product comprising the C$_4$ hydrocarbon content of the mixture and nearly free from methylacetylene.

15. The process of analytically determining the methylacetylene content of a sample of C$_3$ and C$_4$ hydrocarbons including methylacetylene and at least one C$_4$ acetylene which comprises fractionally distilling said sample in a batchwise manner in the presence of propane in amount more than sufficient to take overhead all of said methylacetylene in admixture with propane, taking all of said methylacetylene overhead in admixture with propane, and leaving all C$_4$ acetylenes and some propane in the kettle product.

WILLIAM S. WALLS.
MAURICE R. DEAN.